Patented Aug. 6, 1935

2,010,685

UNITED STATES PATENT OFFICE 2,010,685

HALOGEN DERIVATIVES OF ALIPHATIC ACIDS

Shailer L. Bass, Midland, Mich., assignor to The Dow Chemical Company, Midland, Mich., a corporation of Michigan No Drawing. Application May 31, 1932, Serial No. 614,640

16 Claims. (Cl. 260—113)

The present invention concerns an improved method of chlorinating organic acids and acyl halides having the general formula:—

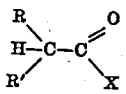

wherein R represents hydrogen or a substituent selected from the class consisting of alkyl, aryl, and aralkyl substituents, R' represents a substituent selected from the class consisting of alkyl, aryl, and aralkyl substituents, and X represents a group selected from halogen, hydroxyl, and acyloxy groups.

The term "acyloxy" as herein employed refers to a group having the general formula:—

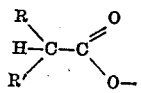

wherein R represents hydrogen or a substituent selected from the class consisting of alkyl, aryl, and aralkyl groups, and R' represents a substituent selected from the class consisting of alkyl, aryl, and aralkyl groups.

The chlorination of aliphatic acids containing more than two carbon atoms (homologues of acetic acid) and the corresponding acyl halides, as ordinarily carried out, results not only in the formation of the desired alpha-chlorinated products, but in the simultaneous formation of considerable quantities of isomeric compounds (e. g. beta-chloro-propionic acid, gamma-chloro-butyryl chloride, etc.) and more highly chlorinated by-products. For instance, Michael, Berichte 34, 4034–71 (1901), has shown that when propionic acid is chlorinated, using light as a catalyst, a difficultly separable mixture containing considerable quantities both of alpha-chloro- and beta-chloro-propionic acids is obtained. When propionyl chloride is chlorinated under similar conditions, a mixture containing isomeric monochloro-propionyl chlorides, in the ratio of about 40 per cent alpha-chloro-propionyl chloride and about 60 per cent of its beta-isomer, along with a considerable quantity of polychlorinated by-products, is obtained. Michael has shown, furthermore, that when isobutyryl chloride is reacted with chlorine, using light as a catalyst, a mixture containing isomeric monochloro-isobutyryl chlorides in the ratio of about 60 to 70 per cent of the alpha-chloro- and about 30 to 40 per cent of the beta-chloro-isomer, along with polychlorinated by-products, is obtained. Normal butyryl chloride, when reacted with chlorine under similar conditions, forms a mixture containing isomeric monochloro-butyryl chlorides in the ratio of about 20 per cent alpha-chloro-, about 60 per cent beta-chloro-, and about 20 per cent the gamma-chloro-butyryl chloride, as well as more highly chlorinated by-products.

I have now found that either a hydrocarbon substituted acetic acid, or corresponding acid anhydride, or acyl halide, containing at least one hydrogen atom linked with the alpha-carbon atom, and having dissolved therewith at least a trace of an acyl halide (preferably an acyl halide corresponding to the substituted acetic acid compound used), may be reacted with chlorine, in the presence of a catalyst capable of forming an intermediate addition compound with an acyl halide, to form an alpha-chlorinated derivative thereof in relatively high yield and as substantially the sole monochlorinated product, the relative yield of more highly chlorinated by-products being, at the same time, reduced materially below the yields thereof ordinarily obtained through chlorinating said aliphatic acid, acid anhydride, or acyl halide in the absence of such catalyst. Among the many catalysts which may be employed to effect such end are:—the halides, oxyhalides, oxygen acids, and oxides of the elements phosphorus, arsenic, antimony, sulphur, selenium, and tellurium; the halides of the elements tin, iron, and aluminum; and the halo-oxygen acids of the elements phosphorus and sulphur. The catalysts mentioned may be employed directly as such or they may be formed within the reaction mixture. For instance, one of the elements mentioned above, or a non-catalytic compound, (e. g. a lower oxide) of such element, may initially be introduced into the reaction mixture and a catalytic chloride or oxychloride of the element be formed through reacting said element, or non-catalytic compound thereof, with chlorine.

When a hydrocarbon substituted acetic acid is to be chlorinated to form the alpha-chloro derivative thereof, according to the present method, it is necessary that there be present both an appreciable quantity of an acyl halide and a catalyst capable of forming an intermediate addition compound with an acyl halide. The acyl halide employed as a reaction promotor may be added to the unchlorinated organic acid or it may be formed in situ from the latter. For instance, a catalyst selected from the class consisting of the halides and oxyhalides of phosphorus, arsenic, antimony, sulphur, selenium, and tellurium, and the halo-oxygen acids of phosphorus and sulphur, may be added to the unchlorinated hydrocarbon substituted acetic acid and the corresponding acyl halide be formed through the reaction of said acid with the catalyst, the latter being simultaneously converted to a different catalytic compound (e. g. to the corresponding oxygen acid). Apparently, the chlorination proceeds through the acyl halide. The acyl halide initially employed as a reaction promotor need not, however, correspond to the hydrocarbon substituted acetic acid to be chlorinated. Propionic acid, for instance, may be reacted with chlorine, in the presence of benzoyl chloride as a reaction promotor and phosphorous acid as a catalyst, to form alpha-chloro-propionic acid as substantially the sole monochlorination product. The major reactions involved are thought to be the following:—

(1) $C_2H_5COOH + C_6H_5COCl \rightleftarrows C_2H_5COCl + C_6H_5COOH$ (2) $C_2H_5COCl + H_3PO_3 \rightleftarrows C_2H_5COCl(H_3PO_3)$

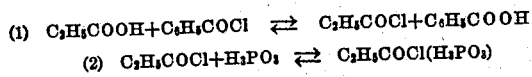

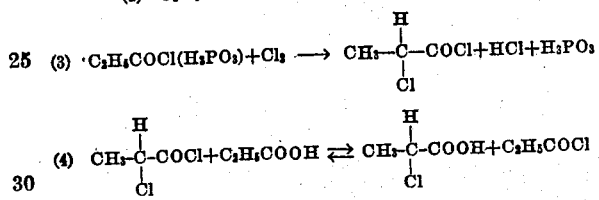

To the accomplishment of the foregoing and related ends, the present invention consists in the method hereinafter fully described and particularly pointed out in the claims, the following description setting forth but several of the various ways in which the principle of the invention may be employed.

In chlorinating a hydrocarbon substituted acetic acid according to my improved method, I first prepare a substantially anhydrous mixture of said acid with, preferably, from about 0.02 to about 0.05 of its molecular equivalent of one of the previously mentioned catalysts and at least a trace of an acyl halide. The mixture is stirred vigorously and heated to a temperature between about 50° and about 140° C. (preferably between about 90° and about 100° C.) and chlorine is introduced until approximately the quantity theoretically required to convert the aliphatic acid to its monochloro derivative has been added. It is important that both under-chlorination and over-chlorination of the aliphatic acid be avoided as nearly as possible, for both the unreacted aliphatic acid and the polychloro derivatives thereof usually can be separated from the alpha-chloro-aliphatic acid product only with difficulty.

The procedure involved in chlorinating a hydrocarbon substituted acetyl halide to form an alpha-chloro derivative thereof is similar to that described above. During the chlorination of a hydrocarbon substituted acetyl bromide or iodide, according to the present method, the monochlorination product consists largely of the corresponding hydrocarbon substituted alpha-chloro-acetyl chloride, e. g. alpha-chloro-propionyl chloride. In this case also, over-chlorination and under-chlorination of the acyl halide should be avoided as nearly as possible, for it is difficult to separate the unreacted acyl halide and the polychlorinated acyl halides from the alpha-chloro product.

The following examples set forth in detail several ways in which the principle of the invention may be practiced. It is to be understood, however, that said examples are not to be construed as a limitation on the invention.

Example 1

Into a 3 liter, 3-neck flask, fitted with a mechanical stirrer, an inlet tube for chlorine, and a reflux condenser attached to a tube leading into a known quantity of dilute aqueous sodium hydroxide, were placed 1110 grams (15.0 moles) of anhydrous propionic acid and 40 grams (0.29 mole) of phosphorus trichloride. The mixture was heated to, and maintained at, about 120° C., stirred vigorously, and chlorine was introduced at a rate of 0.7 gram of chlorine per minute during a 26 hour period, i. e. until titration of the sodium hydroxide solution, used for collecting the hydrogen chloride liberated during reaction, showed 15.0 moles of hydrogen chloride to have been absorbed. The reaction mixture was fractionally distilled, there being collected 33.2 grams (0.45 mole) of unreacted propionic acid and 1415 grams (13.05 moles) of substantially pure alpha-chloro-propionic acid. The yield of alpha-chloro-propionic acid was about 87 per cent of theoretical, based on the quantity of propionic acid employed, and about 95 per cent of theoretical, based on the quantity of materials recovered. No beta-chloro-propionic acid was obtained.

Example 2

Using apparatus similar to that described in Example 1, a mixture of 1110 grams (15.0 moles) of propionic acid and 10 grams (0.07 mole) of sulphur monochloride was treated with chlorine, the latter being introduced to the mixture at a rate of 0.58 gram per minute during a period of 32 hours. The mixture was stirred vigorously and maintained at about 120° C. during the course of the chlorination and 3 additional 10 gram portions of sulphur monochloride were added at about 4 hour intervals during such treatment. After the chlorination was completed the mixture was fractionally distilled, obtaining thereby 1114 grams, or 68 per cent of the theoretical yield, of pure alpha-chloro-propionic acid. No beta-chloro-propionic acid was obtained.

Example 3

A mixture consisting of 296 grams (4.0 moles) of propionic acid and 9.3 grams (0.02 mole) of chlorosulfonic acid was stirred vigorously and maintained at a temperature between about 100° and 110° C. while chlorine was introduced thereto at a rate of 0.15 gram per minute during a period of 40 hours. The mixture was then fractionally distilled, there being obtained 290.6 grams, or 67 per cent of the theoretical yield, of pure alpha-chloro-propionic acid. No beta-chloro-propionic acid was obtained.

Example 4

A mixture consisting of 296 grams (4.0 moles) of propionic acid, 22.3 grams (0.24 mole) of propionyl chloride, and 6.6 grams (0.08 mole) of phosphorous acid was stirred vigorously and maintained at about 100° C. while chlorine was introduced thereto at a rate of 0.22 gram of chlorine per minute during a 28 hour period. The mixture was then fractionally distilled. There was obtained 390 grams of pure alpha-chloro-propionic acid, the yield being about 90 per cent of theoretical, based on the quantity of propionic acid used. No beta-chloro-propionic acid was obtained.

Example 5

A mixture consisting of 2960 grams (40.0 moles) of propionic acid and 110 grams (0.8 mole) of phosphorus trichloride was stirred and heated to about 91° C. and approximately 3266 grams (46 moles) of chlorine was introduced to the stirred and heated mixture at a rate of 0.7 gram of chlorine per minute. Approximately 40.3 moles of hydrogen chloride was liberated during the course of such treatment. The quantities of acyl chlorides present in the reacted mixture was determined by hydrolyzing an aliquot portion of said mixture with water and titrating the hydrochloric acid, so liberated, with silver nitrate. The quantity of water theoretically required to hydrolyze the acyl halides present was then added to the main body of the reaction mixture and the latter was fractionally distilled. There was separated 3985 grams (36.8 moles) of substantially pure alpha-chloro-propionic acid, the yield being 91.8 per cent of theoretical, based on the quantity of propionic acid used. No beta-chloropropionic acid was obtained.

Example 6

A mixture consisting of 264.2 grams (3.0 moles) of normal butyric acid and 20.6 grams (0.15 mole) of phosphorus trichloride was heated to about 100° C., stirred, and chlorine was introduced thereto at a rate of 0.15 gram of chlorine per minute until approximately 98 per cent of the chlorine theoretically required to form a monochloro derivative of the acid had reacted to liberate hydrogen chloride. The reacted mixture was then fractionally distilled. There was separated 313 grams (2.55 moles) of substantially pure alpha-chloro-butyric acid, the yield being 85 per cent of theoretical, based on the quantity of butyric acid used. No isomers of the product were obtained.

Example 7

A mixture consisting of 792 grams (9.0 moles) of isobutyric acid and 24.7 grams (0.180 moles) of phosphorus trichloride was heated to, and maintained at, a temperature between 95° and 100° C., stirred, and 692 grams (9.75 moles) of chlorine was introduced thereto at a rate of 0.25 gram of chlorine per minute. Approximately 8.46 moles of hydrogen chloride was liberated during the reaction. The mixture was fractionally distilled, 123 grams (1.4 moles) of unreacted isobutyric acid and 662 grams (5.4 moles) of alpha-chloro-isobutyric acid being obtained thereby. The yield of the latter was 60 per cent of theoretical, based on the quantity of isobutyric acid used, and 71 per cent of theoretical, based on the difference between the quantity of isobutyric acid used and the quantity thereof recovered as unreacted material. No isomeric monochloro-isobutyric acid was obtained.

Example 8

A mixture consisting of 325 grams (2.5 moles) of propionic anhydride and 4.37 grams (0.0318 mole) of phosphorus trichloride was heated to, and maintained at, approximately 100° C., stirred, and chlorine was introduced thereto at a rate of 0.25 gram of chlorine per minute during 24.4 hour period. The reacted mixture was then fractionally distilled, there being separated 206 grams 1.035 moles), or 41.4 per cent of the theoretical yield, of alpha-chloro-propionic anhydride, and 160 grams (1.475 moles), or 29.5 per cent of the theoretical yield, of alpha-chloro-propionic acid, each of said yields being based on the quantity of propionic acid anhydride used. In addition there were obtained relatively small quantities of propionyl chloride, alpha-chloro-propionyl chloride, and propionic acid. No beta-monochloro compounds were obtained.

The principle of my invention may be applied in ways other than those specifically set forth in the foregoing examples. I have, for instance, reacted chlorine with propionyl chloride in the presence of a mixture of red phosphorus and phosphorus trichloride as catalyst, to form, as the major reaction products, a difficultly separable mixture of alpha-chloro- and alpha-alpha-dichloro-propionyl chlorides. Little, if any, beta-chloro-propionyl chloride was formed in the reaction. As little as 0.02 mole of catalyst per mole of propionyl chloride inhibits the formation of beta-chloro-propionyl chloride. I have found, however, that in order to effectively prevent the formation of monochlorination products other than the desired alpha-chloro-product, during chlorination of an acyl halide, one of the previously mentioned catalysts must be employed in amount representing at least 0.05 mole of catalyst per mole of acyl halide used and that chlorine should be introduced to the mixture at a relatively slow rate; apparently at such rate that the molecular quantity of free chlorine in the mixture at any instant never exceeds the molecular quantity of catalyst present. In practice, the optimum rate of chlorine introduction for a given set of operating conditions may be determined in a test run and that rate thereinafter be employed in chlorinating the same compound under said operating conditions. For practical purposes, the reaction may be carried out successfully by introducing chlorine to the mixture at about one-third the maximum rate at which substantially all of the chlorine introduced is reacted, and by providing for efficient distribution of the chlorine throughout the mixture during reaction.

I have also reacted (1) normal valeric acid with chlorine in the presence of phosphorus trichloride to form alpha-chloro-valeric acid to the substantial exclusion of the formation of isomeric monochlorination products; (2) methyl-ethyl-acetic acid with chlorine in the presence of phosphorus trichloride to form 2-methyl-2-ethyl-2-chloro-acetic acid, substantially no isomeric monochlorination compounds being formed; (3) isovaleric acid with chlorine in the presence of phosphorus trichloride to form alpha-chloro-isovaleric acid as substantially the sole monochlorination product; (4) normal caproic acid with chlorine in the presence of phosphorus trichloride to form alpha-chloro-caproic acid as substantially the sole monochlorination product; (5) stearic acid with chlorine in the presence of phosphorus trichloride to form alpha-chloro-stearic acid as substantially the sole monochlorination product; (6) phenyl-acetic acid with chlorine in the presence of phosphorus trichloride to form alpha-chloro-phenyl-acetic acid as substantially the sole monochlorination product; (7) propionic acid with chlorine, in the presence of aluminum chloride as catalyst and propionyl chloride as a reaction promotor, to form alpha-chloro-propionic acid as substantially the sole monochlorination product; and (8) propionic acid with chlorine, in the presence of ferric chloride as catalyst and propionyl chloride as reaction promotor, to form alpha-chloro-propionic acid as substantially the sole monochlorination product.

Other hydrocarbon substituted acetic acids and derivatives thereof (e. g. 2.2-diphenyl-acetic acid, alpha- and beta-phenyl-propionic acids, 2.2-dibenzyl-acetic acid, 2.2-diphenyl-acetyl bromide, propionyl iodide, butyric acid anhydride, the mixed anhydride of propionic and butyric acids, etc.) may similarly be reacted with chlorine, in the presence of one of the catalysts herein disclosed, to form alpha-chloro derivatives thereof, to the substantial exclusion of the formation of isomeric products.

In addition to the catalysts which have been named specifically, I may employ aluminum tribromide, antimony tribromide, stannic chloride, ferric bromide, or in fact any compound capable of forming an intermediate addition compound with an acyl halide, for such purpose.

As shown in the examples, chlorinations according to the present method are carried out in the liquid phase, ordinarily at a temperature between about 50° and about 140° C. Such chlorinations, however, may sometimes be carried out successfully at temperatures outside the limits mentioned. The principle of my invention is operative regardless of the temperature at which the chlorination is carried out and the temperature limits mentioned are not to be construed as a limitation on the invention.

The present invention, in brief, comprises reacting a compound having the general formula:—

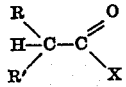

wherein R represents hydrogen or a substituent selected from the class consisting of alkyl, aryl, and aralkyl groups, R' represents a substituent selected from the class consisting of alkyl, aryl, and aralkyl groups, and X represents a group selected from halogen, hydroxyl, and acyloxy groups, with chlorine, in the presence of a catalyst capable of forming an intermediate addition compound with an acyl halide, such catalyst being effective in promoting chlorination in the alpha position of the organic compound so reacted.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of chlorinating a compound having the general formula:—

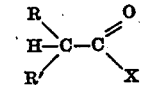

wherein R represents hydrogen or a substituent selected from the class consisting of alkyl, aryl, and aralkyl groups, R' represents a substituent selected from the class consisting of alkyl, aryl, and aralkyl groups, and X represents a group selected from hydroxyl, halogen, and acyloxy groups, to form the alpha-chloro derivative thereof, which comprises reacting said compound with chlorine at a temperature above 50° C. in the presence of a carboxylic acid halide and a catalyst capable of forming an intermediate addition compound with said carboxylic acid halide, the chlorine being employed in sufficient excess over the proportion of catalyst present so that chlorination occurs in the aliphatic radical of the compound under treatment.

2. The method of chlorinating a compound having the general formula:—

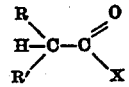

wherein R represents hydrogen or a substituent selected from the class consisting of alkyl, aryl, and aralkyl groups, R' represents a substituent selected from the class consisting of alkyl, aryl, and aralkyl groups, and X represents a group selected from hydroxyl, halogen, and acyloxy groups, to form the alpha-chloro derivative thereof, which comprises reacting said compound with chlorine at a temperature between about 50° and about 140° C. in the presence of a carboxylic acid halide and a catalyst capable of forming an intermediate addition compound with said carboxylic acid halide, the chlorine being employed in sufficient excess over the proportion of catalyst present so that chlorination occurs in the aliphatic radical of the compound under treatment.

3. The method of chlorinating a compound having the general formula:—

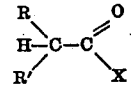

wherein R represents hydrogen or a substituent selected from the class consisting of alkyl, aryl, and aralkyl groups, R' represents a substituent selected from the class consisting of alkyl, aryl, and aralkyl groups, and X represents a group selected from hydroxyl, halogen, and acyloxy groups, to form an alpha-chloro derivative thereof, which comprises reacting said compound with approximately its molecular equivalent of chlorine at a temperature between about 50° and about 140° C., in the presence of both an appreciable quantity of a carboxylic acid halide and a catalyst selected from the class consisting of the halides, oxyhalides, oxygen acids, and oxides of the elements phosphorus, arsenic, antimony, sulfur, selenium, and tellurium; the halides of the elements tin, iron, and aluminum; and the halo-oxygen acids of the elements phosphorus and sulphur, the chlorine being employed in sufficient excess over the proportion of catalyst present so that chlorination occurs in the aliphatic radical of the compound under treatment.

4. The method of chlorinating a compound having the general formula:—

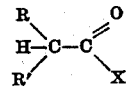

wherein R represents hydrogen or a substituent selected from the class consisting of alkyl, aryl, and aralkyl groups, R' represents a substituent selected from the class consisting of alkyl, aryl, and aralkyl groups, and X represents a group selected from hydroxyl, halogen, and acyloxy groups, to form an alpha-chloro derivative thereof, which comprises reacting said compound with approximately its molecular equivalent of chlorine, in the presence of both an appreciable quantity of a carboxylic acid halide and a catalyst selected from the class consisting of the chlorides, oxychlorides, and oxygen acids of the elements phosphorus, arsenic, antimony, sulphur, selenium, and tellurium; the chlorides of the elements tin, iron, and aluminum; and the chloro-oxygen acids of the elements phosphorus and sulphur, the chlorination being carried out at a temperature between about 50° and about 140° C. and in the presence of between about 0.02 and about 0.05 mole of catalyst for each mole of the compound to be chlorinated used.

5. The method of chlorinating an acid having the general formula:—

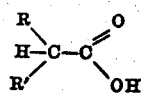

wherein R represents hydrogen or a substituent selected from the class consisting of alkyl, aryl, and aralkyl groups, and R' represents a substituent selected from the class consisting of alkyl, aryl, and aralkyl groups, to form the corresponding alpha-chloro acid as substantially the sole monochlorination product, which comprises reacting said acid with chlorine at a temperature between about 50° and about 140° C. in the presence of both a carboxylic acid halide and a catalyst capable of forming an intermediate addition compound with a carboxylic acid halide, the chlorine being employed in sufficient excess over the proportion of catalyst present so that chlorination occurs in the aliphatic radical of the organic acid under treatment.

6. The method of chlorinating an acid having the general formula:—

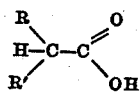

wherein R represents hydrogen or a substituent selected from the class consisting of alkyl, aryl- and aralkyl groups, and R' represents a substituent selected from the class consisting of alkyl, aryl, and aralkyl groups, to form the corresponding alpha-chloro acid as substantially the sole monochlorination product, which comprises reacting said acid with chlorine in the presence of both a carboxylic acid halide and a catalyst selected from the class consisting of the halides, oxyhalides, oxygen acids, and oxides of the elements phosphorus, arsenic, antimony, sulphur, selenium, and tellurium; the halides of the elements tin, iron, and aluminum; and the halo-oxygen acids of the elements phosphorus and sulphur, the chlorination being carried out at a temperature between about 50° and about 140° C. and in the presence of between about 0.02 and about 0.05 mole of catalyst for each mole of the organic acid employed using sufficient chlorine to monochlorinate the aliphatic radical of said organic acid.

7. The method of chlorinating an acid having the general formula:—

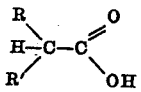

wherein R represents hydrogen or a substituent selected from the class consisting of alkyl, aryl, and aralkyl groups, and R' represents a substituent selected from the class consisting of alkyl, aryl, and aralkyl groups, to form the corresponding alpha-chloro acid- as substantially the sole monochlorination product, which comprises reacting said acid with approximately its molecular equivalent of chlorine in the presence of both a carboxylic acid halide and a catalyst selected from the class consisting of the chlorides, oxychlorides, and oxygen acids of the elements phosphorus, arsenic, antimony, sulphur, selenium, and tellurium; the chlorides of the elements tin, iron, and aluminum; and the chloro-oxygen acids of the elements phosphorus and sulphur, the chlorination being carried out at a temperature between about 50° and about 140° C. and in the presence of between about 0.02 and about 0.05 mole of catalyst for each mole of the organic acid employed.

8. The method of chlorinating an acid having the general formula:—

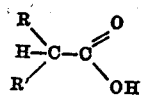

wherein R represents hydrogen or a substituent selected from the class consisting of alkyl, aryl, and aralkyl groups, and R' represents a substituent selected from the class consisting of alkyl, aryl, and aralkyl groups, to form the corresponding alpha-chloro acid as substantially the sole monochlorination product, which comprises reacting said acid with approximately its molecular equivalent of chlorine in the presence of both a carboxylic acid halide and of a catalyst selected from the class consisting of the chlorides, oxychlorides, and oxygen acids of sulphur, and the chlorides of iron and aluminum, the chlorination being carried out at a temperature between about 50° and about 140° C. and between about 0.02 and about 0.05 mole of catalyst being used for each mole of the organic acid employed.

9. The method of chlorinating an acid having the general formula:—

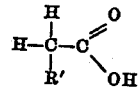

wherein R' represents a substituent selected from the class consisting of alkyl, aryl, and aralkyl groups, to form the alpha-chloro derivative thereof, which comprises reacting said acid with chlorine at a temperature between about 50° and about 140° C. in the presence of both a carboxylic acid halide and a catalyst capable of forming an intermediate addition compound with a carboxylic acid halide, the chlorine being employed in sufficient excess over the proportion of catalyst present so that chlorination occurs in the aliphatic radical of the organic acid under treatment.

10. The method of chlorinating an acid having the general formula:—

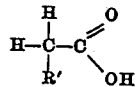

wherein R' represents a substituent selected from the class consisting of alkyl, aryl, and aralkyl groups, to form the corresponding alpha-chloro acid as substantially the sole monochlorination product, which comprises reacting said acid with approximately its molecular equivalent of chlorine at a temperature between about 50° and about 140° C. in the presence of both a carboxylic acid halide and a catalyst selected from the class consisting of the halides, oxyhalides, oxygen acids, and oxides of the elements phosphorus, arsenic, antimony, sulphur, selenium, and tellurium; the halides of the elements tin, iron, and aluminum, and the halo-oxygen acids of the elements phosphorus and sulphur, the chlorine being employed in sufficient excess over the proportion of catalyst present so that chlorination occurs in the aliphatic radical of the organic acid under treatment.

11. The method of chlorinating an acid having the general formula:—

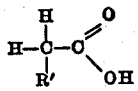

wherein R' represents a substituent selected from the class consisting of alkyl, aryl, and aralkyl groups, to form the corresponding alpha-chloro acid as substantially the sole monochlorination product, which comprises reacting said acid with approximately its molecular equivalent of chlorine in the presence of both a carboxylic acid chloride and a catalyst selected from the class consisting of the chlorides, oxychlorides, and oxygen acids of the elements phosphorus, arsenic, antimony, sulphur, selenium, and tellurium; the chlorides of the elements tin, iron, and aluminum; and the chloro-oxygen acids of the elements phosphorus and sulphur, the chlorination being carried out at a temperature between about 50° and about 140° C. and in the presence of between about 0.02 and about 0.05 mole of catalyst for each mole of organic acid employed.

12. The method of chlorinating an acyl halide having the general formula:—

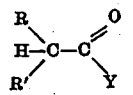

wherein R represents hydrogen or a substituent selected from the class consisting of alkyl, aryl, and aralkyl groups, R' represents a substituent selected from the class consisting of alkyl, aryl, and aralkyl groups, and Y represents halogen, to form an alpha-chloro acyl halide therefrom, which comprises reacting said acyl halide with chlorine at a temperature between about 50° and about 140° C. in the presence of a catalyst capable of forming an intermediate addition compound with a carboxylic acid halide, sufficient chlorine being employed to monochlorinate the aliphatic radical of the acyl halide under treatment.

13. The method of chlorinating an acyl halide having the general formula:—

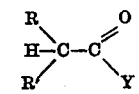

wherein R represents hydrogen or a substituent selected from the class consisting of alkyl, aryl, and aralkyl groups, R' represents a substituent selected from the class consisting of alkyl, aryl, and aralkyl groups, and Y represents halogen, to form an alpha-chloro acyl halide therefrom, which comprises reacting said acyl halide with approximately its molecular equivalent of chlorine at a temperature between about 50° and about 140° C. in the presence of a catalyst selected from the class consisting of the halides, oxyhalides, oxygen acids, and oxides of the elements phosphorus, arsenic, antimony, sulphur, selenium, and tellurium; the halides of the elements tin, iron, and aluminum; and the halo-oxygen acids of the elements phosphorus and sulphur.

14. The method of chlorinating an acyl chloride having the general formula:—

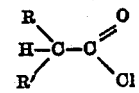

wherein R represents hydrogen or a substitutent selected from the class consisting of alkyl, aryl, and aralkyl groups, and R' represents a substituent selected from the group consisting of alkyl, aryl, and aralkyl substituents, to form the corresponding alpha-chloro acyl chloride as substantially the sole monochlorination product, which comprises reacting said acyl chloride with approximately its molecular equivalent of chlorine in the presence of a catalyst selected from the class consisting of the chlorides, oxychlorides, and oxygen acids of the elements phosphorus, arsenic, antimony, sulphur, selenium, and tellurium; the chlorides of the elements tin, iron, and aluminum; and the chloro-oxygen acids of the elements phosphorus and sulphur, the chlorination being carried out at a temperature between about 50° and about 140° C. and in the presence of between about 0.02 and about 0.05 mole of catalyst for each mole of acyl halide used.

15. The method of chlorinating propionic acid which comprises reacting said acid with approximately its molecular equivalent of chlorine in the presence of both propionyl chloride and a catalyst selected from the class consisting of the chlorides, oxychlorides, and oxygen acids of the elements phosphorus, arsenic, antimony, sulphur, selenium, and tellurium; the chlorides of the elements tin, iron, and aluminum; and the chloro-oxygen acids of the elements phosphorus and sulphur, the chlorination being carried out at a temperature between about 50° and about 140° C. and in the presence of between about 0.02 and about 0.05 mole of catalyst for each mole of propionic acid employed.

16. The method of chlorinating butyric acid to form alpha-chloro-butyric acid which comprises reacting said acid with approximately its molecular equivalent of chlorine in the presence of both butyryl chloride and a catalyst selected from the class consisting of the chlorides, oxychlorides, and oxygen acids of the elements phosphorus, arsenic, antimony, sulphur, selenium, and tellurium; the chlorides of the elements tin, iron, and aluminum; and the chloro-oxygen acids of the elements phosphorus and sulphur, the chlorination being carried out at a temperature between about 50° and about 140° C. and in the presence of between about 0.02 and about 0.05 mole of catalyst for each mole of proprionic acid employed.

SHAILER L. BASS.